(12) United States Patent
Lessi

(10) Patent No.: US 7,547,349 B2
(45) Date of Patent: Jun. 16, 2009

(54) METHOD FOR SUPPLYING PASSENGERS OF AN AIRCRAFT WITH AN OXYGEN-RICH GAS MIXTURE

(75) Inventor: Stéphane Lessi, Grenoble (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 549 days.

(21) Appl. No.: 10/539,157

(22) PCT Filed: Dec. 8, 2003

(86) PCT No.: PCT/FR03/50156

§ 371 (c)(1),
(2), (4) Date: Jun. 14, 2005

(87) PCT Pub. No.: WO2004/056451

PCT Pub. Date: Jul. 8, 2004

(65) Prior Publication Data

US 2006/0117950 A1    Jun. 8, 2006

(30) Foreign Application Priority Data

Dec. 18, 2002    (FR) .................................. 02 16122

(51) Int. Cl.
*B01D 59/26*    (2006.01)

(52) U.S. Cl. .......................................... 95/130; 96/108
(58) Field of Classification Search ...................... 95/96, 95/130; 96/108
See application file for complete search history.

(56) References Cited

U.S. PATENT DOCUMENTS 4,194,891 A * 3/1980 Earls et al. ...................... 95/98
4,406,675 A    9/1983 Dangieri et al.

FOREIGN PATENT DOCUMENTS

| EP | 0 297 542 | 1/1989 |
| EP | 0 461 478 | 12/1991 |
| EP | 0 486 926 | 5/1992 |
| EP | 1 245 266 | 10/2002 |
| FR | 2 823 180 | 3/2004 |

* cited by examiner

*Primary Examiner*—Robert A Hopkins
(74) *Attorney, Agent, or Firm*—Christopher J. Cronin

(57) ABSTRACT

Methods of supplying an oxygen rich mixture to the occupants of an aircraft. The mixture is produced through a pressure swing adsorption system which has both an adsorption/production phase and a desorption/regeneration phase. The duration of one cycle of the adsorption system is less than ten seconds. The system makes use of a high-performance adsorbent which has a particle size of less than about 0.8 mm. The feed air which is introduced to the system has an inlet temperature between 50° C. and 90° C.

12 Claims, 1 Drawing Sheet

METHOD FOR SUPPLYING PASSENGERS OF AN AIRCRAFT WITH AN OXYGEN-RICH GAS MIXTURE

BACKGROUND

To optimize the ratio of oxygen produced to on-board mass, it has been proposed to use high-performance adsorbents, in particular faujasite-type zeolites modified by digestion or having a high degree of lithium exchange, such as those described in document EP-A-0 297 542 or EP-A-461 478In practice, the high-performance adsorbents of this type are used with an intake mixture temperature close to room temperature, below 40° C.

On-board systems for generating an oxygen-rich gas mixture, commonly called OBOGS (on-board oxygen generating systems), have been known for several decades for supplying the pilots of military warplanes with oxygen and are beginning to be fitted into civil transport aircraft, as disclosed in document FR-A-2 823 180 in the name of the Applicant.

To optimize the ratio of oxygen produced to on-board mass, it has been proposed to use high-performance adsorbents, in particular faujasite-type zeolites modified by digestion or having a high degree of lithium exchange, such as those described in document EP-A-0 297 542 or EP-A-461 478. In practice, the high-performance adsobents of this type are used with an intake mixture temperature close to room temperature close to room temperature, below 40° C.

SUMMARY

The present invention relates to a method of supplying occupants of an aircraft with an oxygen-rich mixture by air separation in a pressure swing adsorption (PSA) system.

The Applicant has found that, in on-board applications, which are necessarily compact and have high flow rates, by optimizing the PSA process it is possible to operate at higher temperatures without, however, reducing performance.

Thus, the subject of the invention is a method comprising, in one cycle, a high-pressure adsorption/production phase and a low-pressure desorption/regeneration phase, employing a high-performance adsorbent having a particle size not exceeding 0.8 mm, the duration of the cycle not exceeding 10 seconds, and the feed air is introduced at a temperature between 50 and 90° C., typically between 60 and 80° C. and advantageously between 60 and 70° C.

Brief Description of the Drawing

For a further understanding of the nature and objects for the present invention, reference should be made to the following detailed description, taken in conjunction with the accompanying drawing, in which like elements are given the same or analogous reference numbers and wherein.

Description of Preferred Embodiments

Figure 1:
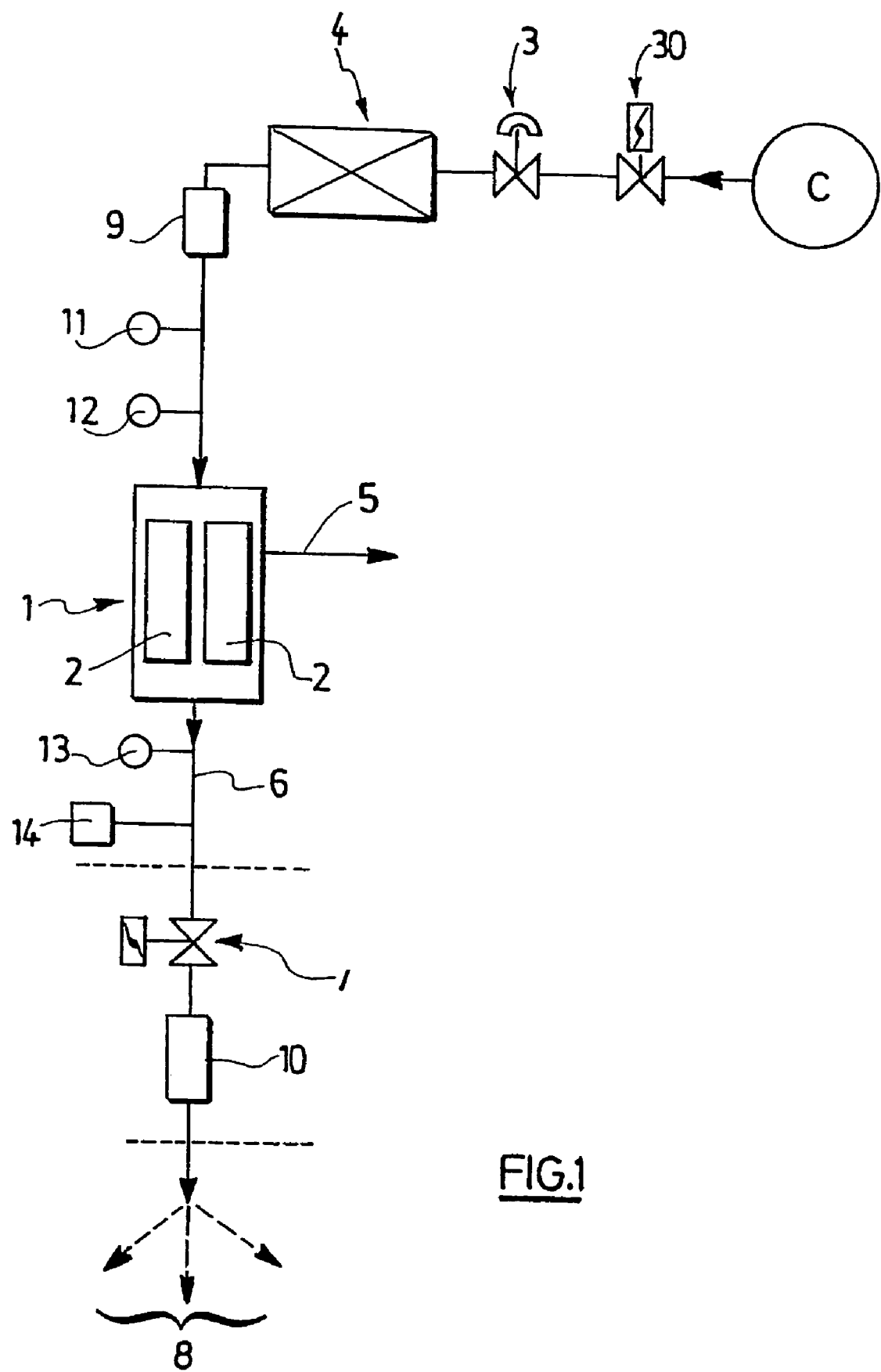
FIG. 1 illustrates a schematic representation of one embodiment, according to the current invention, for a method of supplying an oxygen rich gas mixture to occupants of an aircraft.

The present invention relates to a method of supplying occupants of an aircraft with an oxygen-rich gas mixture by air separation in a pressure swing adsorption (PSA) system.

According to more particular features of the invention:

the adsorbent, advantageously a zeolite X with a lithium content of greater than 85%, advantageously greater than 90%, has a particle size not exceeding 0.6 mm on average;

the duration of the cycle is between about 5 and 9 seconds;

typically, the feed air is introduced at a flow rate of between 300 and 400 Nl/min (for the individual supply to a pilot or to a navigator with a useful consumption rate of between 10 and 50 Nl/min under standard temperature and pressure conditions) or between 3300 and 3600 Nl/min (for supply to several rows of passengers of an airliner with a useful consumption rate of between 100 and 500 Nl/min); and the feed air is introduced at a pressure of less than 5 bar ($5 \times 10^5$ Pa), the desorption pressure being close to the ambient atmospheric pressure.

The Applicant has found that with such adsorption temperatures the kinetics are improved, this being significant in the case of OBOGS, and the yield is also improved.

Moreover, the hot feed air makes it possible to moderate the thermal profiles in the adsorbent beds.

Finally, since the on-board separation systems are fed with compressed air coming from a compression stage of an aircraft engine with a temperature generally above 150° C., the process according to the invention makes it possible to considerably reduce the size of the exchangers for cooling the feed air, and therefore to save weight and space.

Recognizable in FIG. 1 is a PSA unit 1, comprising at least two adsorbers 2 operating alternately, which receives, from a compressor stage C of the aircraft engine, a stream of compressed hot air, flow-rate controlled at 30 and pressure-controlled in a pressure controller 3, and cooled in a heat exchanger 4, to be separated in the unit 1 into a stream 5 of nitrogen-enriched mixture, used for example to inert compartments or tanks on the aircraft, and a stream 6 of oxygen-enriched mixture that is conveyed, via a regulating valve 7, to user networks 8, for example oxygen masks for the passengers and/or crew.

The gas transfer chain is completed by an inlet mass flow meter 9, an outlet mass flow meter 10, an inlet temperature sensor 11, an inlet pressure sensor 12, an outlet pressure sensor 13 and an oxygen content analyzer 14, these various sensors, connected to a control system (not shown), allowing the flow rates and the pressures along the chain to be adjusted.

In one particular embodiment suitable for supplying commercial aircraft passengers, an oxygen supply subassembly typically comprises two twinned adsorbers 2 operating in alternating cycles and using, as adsorbent, an LiX zeolite having an Si/Al ratio between 1 and 1.25 and exchanged to more than 92% with lithium cations. The intake pressure is about 3 bar for a desorption pressure of about 0.5 bar. The flow rate of the intake air is between 3400 and 3500 Nl/min. The temperature of the intake air is between 60 and 65° C. and the cycle time is 2×4 seconds.

Although the invention has been described in relation to particular embodiments, it is not limited thereby but is capable of modifications and of variants that will become apparent to those skilled in the art within the context of the claims hereinbelow.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for supplying occupants of an aircraft with an oxygen rich gas mixture, said method comprising producing an oxygen-rich gas mixture by air separation in a pressure swing adsorption system, wherein:
   a) one cycle of said pressure swing adsorption system comprises:
      1) an adsorption/production phase;
      2) a desorption/regeneration phase; and
      3) a duration less than about 10 seconds;
   b) said pressure swing adsorption system comprises a high-performance adsorbent, wherein said adsorbent has a particle size less than about 0.8 mm; and
   c) feed air is introduced to said pressure swing adsorption system at an inlet temperature between about 50° C. and about 90° C., wherein the feed air is obtained from a stream of hot air from a compressor stage of an aircraft engine which is subsequently cooled in a heat exchanger.

2. The method of claim 1, wherein said inlet temperature is between about 60° C. and 80° C.

3. The method of claim 2, wherein said inlet temperature is between about 60° C. and about 70° C.

4. The method of claim 1, wherein the average size of said particles is less than about 0.6 mm.

5. The method of claim 1, wherein said duration is between about 6 seconds and about 9 seconds.

6. The method of claim 1, wherein said feed air is introduced to said pressure swing adsorption system with a pressure less than about 5 bar.

7. The method of claim 6, wherein said fed air is introduced to said pressure swing adsorption system at a flow rate between about 300 Nl/min and about 3600 Nl/min.

8. The method of claim 1, wherein said adsorbent comprises zeolite X with a lithium content greater than about 85%.

9. The method of claim 8, wherein said adsorbent comprises zeolite X with a lithium content greater than about 90%.

10. The method of claim 8, wherein said zeolite has an Si/Al ratio between about 1 and about 1.25.

11. A method which may be used for supplying occupants of an aircraft with an oxygen rich gas mixture, said method comprising producing an oxygen-rich gas mixture by air separation in a pressure swing adsorption system, wherein:
   a) one cycle of said pressure swing adsorption system comprises:
      1) an adsorption/production phase;
      2) a desorption/regeneration phase; and
      3) a duration between about 6 seconds and about 9 seconds;
   b) said pressure swing adsorption system comprises a high-performance adsorbent, wherein said adsorbent has an average particle size less than about 0.6 mm; and
   c) feed air is introduced to said pressure swing adsorption system at an inlet temperature between about 60° C. and about 80° C., wherein the feed air is obtained from a stream of hot air from a compressor stage of an aircraft engine which is subsequently cooled in a heat exchanger.

12. A method which may be used for supplying occupants of an aircraft with an oxygen rich gas mixture, said method comprising producing an oxygen-rich gas mixture by air separation in a pressure swing adsorption system, wherein:
   a) one cycle of said pressure swing adsorption system comprises:
      1) an adsorption/production phase;
      2) a desorption/regeneration phase; and
      3) a duration between about 6 seconds and about 9 seconds;
   b) said pressure swing adsorption system comprises a high-performance adsorbent, wherein:
      1) said adsorbent has a particle size less than about 0.8 mm;
      2) said adsorbent comprises zeolite X with a lithium content greater than about 90%; and
      3) said zeolite has a Si/Al ratio between about 1 and about 1.25; and
   c) feed air is introduced to said pressure swing adsorption system, wherein said feed air:
      1) has an inlet temperature between about 60° C. and about 70° C.;
      2) has an inlet pressure less than about 5 bar;
      3) has an inlet flow rate between about 300 Nl/min and about 3600 Nl/min;
      4) is obtained from a stream of hot air from a compressor stage of an aircraft engine which is subsequently cooled in a heat exchanger.

* * * * *